US008585809B2

(12) United States Patent
Clair et al.

(10) Patent No.: US 8,585,809 B2
(45) Date of Patent: Nov. 19, 2013

(54) AIR DRYER CARTRIDGE

(75) Inventors: Eugene Clair, Berea, OH (US);
Leonard Quinn, LaGrange, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 280 days.

(21) Appl. No.: 13/208,008

(22) Filed: Aug. 11, 2011

(65) Prior Publication Data
US 2013/0036912 A1 Feb. 14, 2013

(51) Int. Cl.
*B01D 53/02* (2006.01)
(52) U.S. Cl.
USPC ............ 96/143; 96/147; 96/151; 55/417; 55/420; 55/DIG. 17
(58) Field of Classification Search
USPC ........ 96/143, 147, 151; 55/417, 420, DIG. 17
See application file for complete search history.

(56) References Cited

U.S. PATENT DOCUMENTS

| | | | | |
|---|---|---|---|---|
| 4,108,617 A * | 8/1978 | Frantz | ............... | 96/114 |
| 4,131,442 A * | 12/1978 | Frantz | ............... | 96/137 |
| 4,468,239 A * | 8/1984 | Frantz | ............... | 96/114 |
| 4,572,394 A | 2/1986 | Tanahashi et al. | | |
| 5,458,676 A * | 10/1995 | Herbst et al. | ............... | 96/109 |
| 5,607,500 A | 3/1997 | Shamine et al. | | |
| 5,961,698 A | 10/1999 | Dossaji et al. | | |
| 6,126,724 A * | 10/2000 | Martin et al. | ............... | 96/4 |
| 6,951,581 B2 * | 10/2005 | Fornof et al. | ............... | 95/122 |
| 7,520,922 B2 | 4/2009 | Hoffman et al. | | |
| 7,625,437 B2 * | 12/2009 | Heer | ............... | 96/134 |
| 8,262,784 B2 * | 9/2012 | Walker et al. | ............... | 96/110 |
| 2010/0212505 A1 * | 8/2010 | Walker et al. | ............... | 96/110 |
| 2012/0031273 A1 * | 2/2012 | Heer | ............... | 96/116 |

OTHER PUBLICATIONS

Bendix AD-SP Service Data Sheet SD-08-2415, Oct. 2004 Bendix Commercial Vehicle Systems LLC.

* cited by examiner

*Primary Examiner* — Christopher P Jones
(74) *Attorney, Agent, or Firm* — Fay Sharpe LLP

(57) ABSTRACT

An air dryer cartridge 100 configured for use on both conventional air dryer systems having internal purge air valving and newer air dryer systems wherein at least some of the purge air valving is located in the cartridge. The air dryer cartridge 100 has a first connector 112 for mating with a corresponding connector of a conventional air dryer system, and a second connector 156 for mating with a corresponding connector of a newer-style air dryer system. When the cartridge 100 is installed on a conventional air dryer system, purge air valving 144/146 within the cartridge is deactivated causing the cartridge to act as a conventional air dryer cartridge. When the cartridge 100 is installed in a newer-style system, the purge air valving 144/166 within the cartridge is activated thus enabling the system to function as designed.

20 Claims, 5 Drawing Sheets

AIR DRYER CARTRIDGE

BACKGROUND

The present invention relates to air dryers. It finds particular application in conjunction with air dryers used on vehicles and will be described with particular reference thereto. It will be appreciated, however, that the invention is also amenable to other applications.

Air dryers are used, for example, on heavy vehicles for drying compressed air delivered from a compressor to a vehicle operating storage reservoir for use in operating various systems on the vehicle that utilize compressed air. One type of air dryer includes a cartridge, which includes a desiccant material through which the compressed air passes while being dried. The cartridge is secured to an air dryer housing, most commonly via a threaded connection.

As the compressor provides air during a charging cycle, the desiccant becomes saturated with moisture and other contaminants that are removed from the compressed air. At the end of the charging period the air dryer is switched into a regeneration mode during which previously dried compressed air is circulated back through the desiccant material. As the dried air passes through the desiccant, the moisture and contaminants in the desiccant are captured in the airflow and thereby removed from the desiccant. The air including the moisture and contaminants is then expelled (e.g., exhausted) from the air dryer. After the regeneration mode is complete, the air dryer can once again execute a charge cycle.

In older air dryer systems, air from the vehicle operating storage reservoir is used during the regeneration cycle. Such air, however, may not be sufficiently dry and clean to effectively regenerate the desiccant since it the performance of the desiccant decreases during the charge cycle and the air then recirculated through the desiccant is from the tail end of the charge cycle when the desiccant is less effective.

Thus, it has been found desirable to store the driest and cleanest air from that charge cycle in a regeneration storage volume separate from the vehicle operating storage volume. In this regard, air dryer systems have been developed wherein the first air passing through the desiccant at the beginning of a charge cycle is stored in the regeneration storage volume. In some systems, a valve is included internal to the air dryer that is operative to channel the initial flow from the dryer cartridge to the regeneration storage volume. Once the regeneration storage volume is filled, the valve then operates to channel air to the vehicle operating storage volume.

In commonly-assigned U.S. Pat. No. 7,520,922, such valving is included in a removable dryer cartridge, separate from the air dryer unit. The cartridge disclosed in the '922 patent includes a desiccant volume, a desiccant in the desiccant volume for removing at least one of moisture and contaminants from air, a first passage in fluid communication with the desiccant volume and a first air storage volume (e.g., a regeneration storage volume), a second passage in fluid communication with the desiccant volume and in fluid communication with a second air storage volume (e.g., a vehicle operation storage volume), and a valve which, in a first position, restricts the fluid communication between the desiccant volume and the first air storage volume.

Although the desiccant in either type of system is frequently regenerated in the manner described above, it is to be understood that the desiccant degrades over time due to the presence of contaminants (e.g., oil) in the incoming air stream. In fact, more and more residual oil and contaminants can be retained in the desiccant after each regeneration cycle. Therefore, over time, the desiccant becomes oil saturated such that it cannot be satisfactorily regenerated by the regeneration cycle described above. Although the life of the desiccant may be extended by improved purge functionality, at some point, the desiccant must be replaced. To this end, a spent cartridge may be replaced with a new cartridge containing fresh desiccant.

The process for replacing the dryer cartridge is generally straightforward and typically involves unscrewing the spent cartridge and threading-on the proper replacement cartridge depending on whether the air dryer system being serviced has the internal valving or the cartridge valving as the system described in the '922 patent. As will be appreciated, to avoid consumers installing the wrong cartridge on an air dryer unit, a standard thread size has evolved wherein a 39 mm thread size is used in the industry for standard cartridges designed for air dryer units having the internal valving. A cartridge having the internal valving, such as that disclosed in the '922 patent, has a different size thread diameter (e.g., 31 mm). Thus, cartridges containing the valving will not fit a dryer having the internal valve arrangement, and vice versa. This ensures that only the proper replacement cartridge is installed on a given air dryer unit, but requires the manufacture of separate cartridges to fit both types of air dryer systems.

SUMMARY

In accordance with one aspect, a single air dryer cartridge is configured for use on both conventional air dryer systems having internal purge air valving and newer air dryer systems wherein at least some of the purge valving is located in the cartridge. The air dryer cartridge has a first connector for mating with a corresponding connector of a conventional air dryer system, and a second connector for mating with a corresponding connector of a newer-style air dryer system. When the cartridge is installed on a conventional air dryer system, purge air valving within the cartridge is deactivated causing the cartridge to act as a conventional air dryer cartridge. When the cartridge is installed in a newer-style system, the purge air valving within the cartridge is activated thus enabling the system to function as designed.

In accordance with another aspect, a cartridge for an air dryer comprises a cartridge housing, a desiccant volume within the cartridge housing containing a desiccant for removing at least one of moisture and contaminants from a stream of air, an intake port in fluid communication with the desiccant volume, a delivery port in fluid communication with the intake port via the desiccant volume, a flow control device for controlling flow between the desiccant volume and the delivery port, and a selectively openable bypass passage for bypassing flow around the check valve.

In one embodiment, the bypass passage is not blocked when the cartridge is installed on a first type of air dryer thereby bypassing flow around the flow control device, and the bypass passage is blocked when the cartridge is installed on a second type of air dryer thereby directing substantially all flow between the desiccant volume and the delivery port through the flow control device. The cartridge can further comprise a first connector adapted to receive a nipple of a first diameter associated with a first type of air dryer for securing the cartridge thereto, and a second connector arranged concentrically with the first connector and adapted to receive a nipple of a second diameter smaller than the first diameter associated with a second type of air dryer for securing the cartridge thereto. The second connector can be part of a movable member supported between the desiccant volume and the delivery port that is moveable telescopically between a first position whereat the second connector is axially coextensive with the first connector and a second position whereat the second connector is axially adjacent the first connector. The movable member can include the flow control device and the bypass passage, the movable member configured to restrict flow through the bypass passage when the movable member is in the first position. The bypass passage can be in a tubular sidewall of the movable part. The flow control device can include at least one of a check valve and/or an orifice.

The first and second connectors can include threaded bores for threadedly engaging respective threaded nipples. The second connector can be closely received within the first connector such that when the first connector is threadedly engaged with an associated corresponding threaded nipple, the second connector is displaced by said nipple from the first position to the second position. The second connector can be biased towards the first position. The cartridge can be installed in air dryer systems having two different types of connections, such as 39 mm and 31 mm threaded nipples.

In accordance with another aspect, a base assembly for an air dryer cartridge comprises a base including a first connector adapted to receive a nipple of first diameter for fluidly connecting the cartridge with a first type of air dryer, and a second connector arranged concentrically with the first connector and adapted to receive a nipple of a second diameter smaller than the first diameter for fluidly connecting the cartridge to a second type of air dryer, wherein the second connector is movable with respect to the first connector between a first position axially coextensive with the first connector, and a second position axially adjacent the first connector.

The first connector can be a threaded bore, and the second connector can include a tubular portion telescopically received within the threaded bore when the second connector is in the first position. The second connector can be part of a movable member including a flow control device adapted to control the flow of air through the base, and a bypass passage for bypassing air around the flow control device, and the second connector can block the flow of air through the bypass passage when in the first position, and permits flow of air through the bypass passage when in the second position. The second connector can include a sealing surface adapted to seal the second connector to the base to restrict flow through the bypass passage when the second connector is in the first position. The flow control device can include at least one of a check valve and/or an orifice.

In accordance with yet another aspect, an air dryer cartridge has a first air flow path and a second air flow path, and means for selectively attaching the air dryer cartridge to an associated air dryer so to pass air flow during a purge cycle through the first or second air flow path. The first air flow path can include a restriction, and the second air flow path can bypass the restriction in the first air flow path.

In accordance with still another aspect, an air dryer cartridge comprises a desiccant volume including a desiccant material, and a base including a first connector configured to receive a nipple of first diameter for fluidly connecting the cartridge with a first type of air dryer, and a second connector arranged concentrically with the first connector and configured to receive a nipple of a second diameter smaller than the first diameter for fluidly connecting the cartridge to a second type of air dryer. The second connector is movable with respect to the first connector between a first position axially coextensive with the first connector, and a second position axially adjacent the first connector. The air dryer cartridge has a first air flow path through the desiccant material during a purge cycle when the first connector is engaged with an associated first type of air dryer, and a second air flow path through the desiccant material, different than the first flow path, when the second connector is engaged with an associated second type of air dryer.

One advantage of the disclosure is that a single cartridge can be manufactured for two different types of air dryer systems thereby eliminating the need to manufacture separate parts for each type of system.

Still further advantages of the subject innovation will be appreciated by those of ordinary skill in the art upon reading and understanding the following detailed description.

BRIEF DESCRIPTION OF THE DRAWINGS

The innovation may take form in various components and arrangements of components, and in various steps and arrangements of steps. The drawings are only for purposes of illustrating various aspects and are not to be construed as limiting the invention.

DETAILED DESCRIPTION

Figure 1:
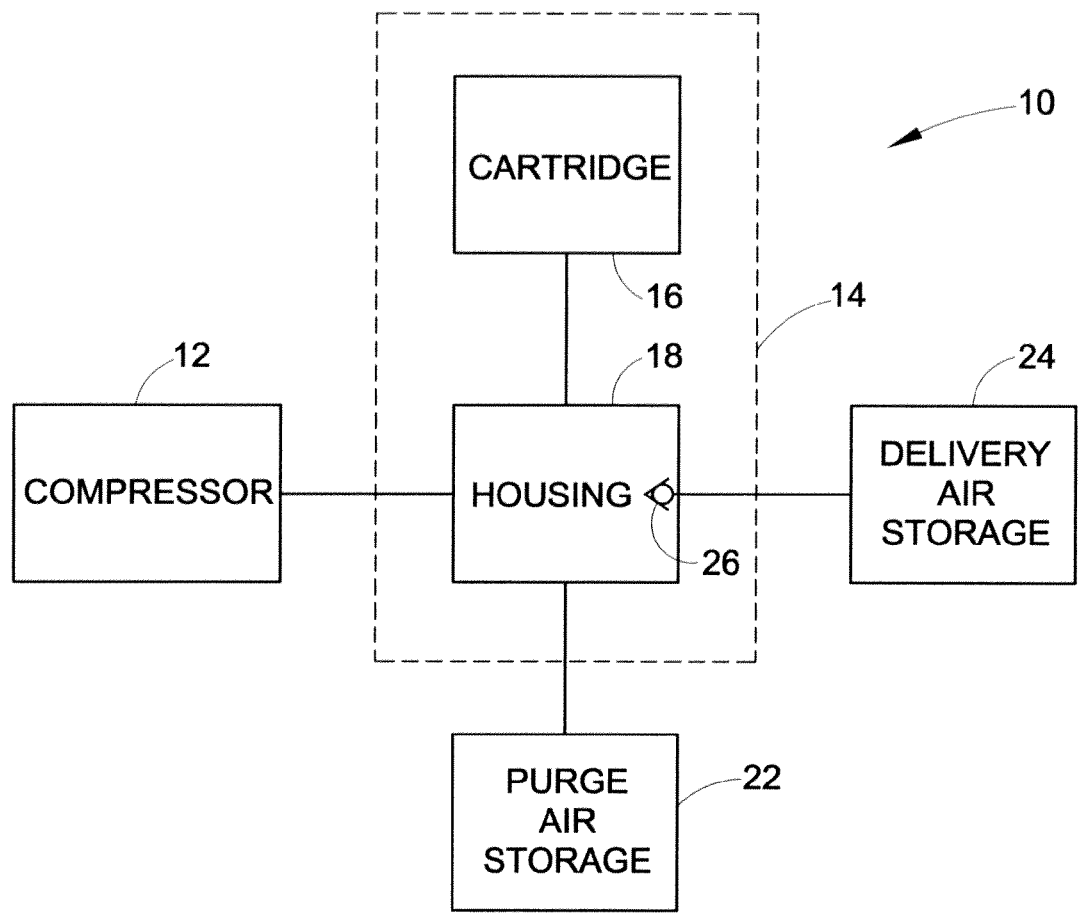
FIG. 1 illustrates an exemplary air dryer system.

With reference to FIG. 1, a system 10 for drying compressed air is illustrated. The system 10 includes a compressor 12 for supplying compressed air. The compressed air is communicated from the compressor 12 to an air dryer 14, which includes a cartridge 16 and a housing 18, which is integrally connected to the cartridge 16. The air dryer 14 variably and fluidly communicates with a purge air storage volume 22 and a delivery air storage volume 24. The cartridge 16 communicates with the purge air storage volume 22 and the delivery storage volume 24 via the air dryer housing 18. A system check valve 26 (also referred to as a delivery communication valve and a delivery check valve) controls delivery of the compressed air from the air dryer 14 to the air storage volume 24. In the system illustrated in FIG. 1, the system check valve 26 is located in the housing 18 of the air dryer 14. However, it will be appreciated that other arrangements are also possible.

Figure 2:
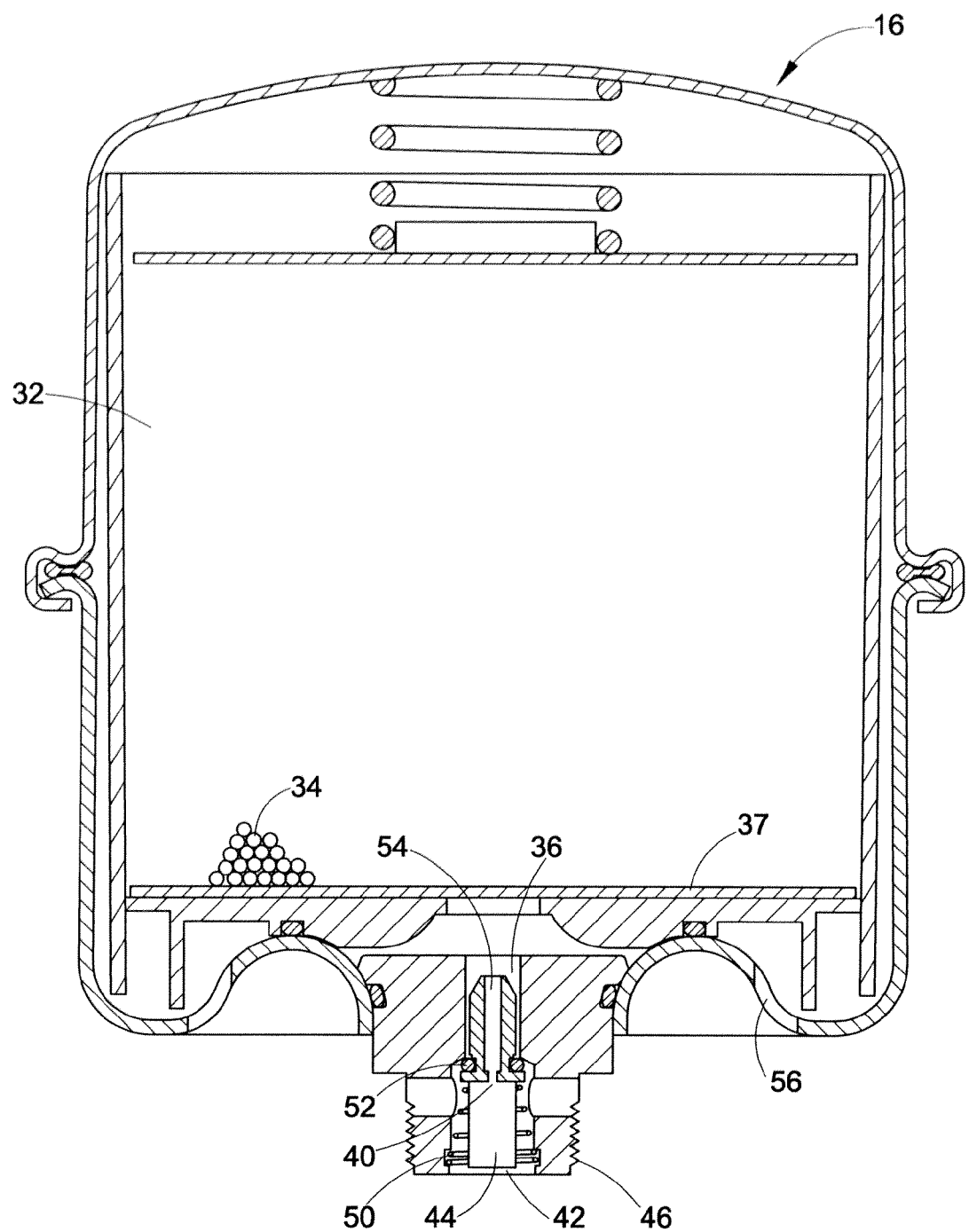
FIG. 2 illustrates a prior art air dryer cartridge for use with the system of FIG. 1.

With additional reference to FIG. 2, a prior art cartridge 16 for use with the air dryer 14 is illustrated. The cartridge 16 includes a desiccant volume 32, which includes a desiccant material 34 for removing at least one of moisture and contaminants from the air received from the compressor 12. An exit passage 36 in the cartridge 16 fluidly communicates with the desiccant volume 32 through element 37 which may be a screen or other perforate member. A delivery passage 40 fluidly communicates with the desiccant volume 32 via the exit passage 36 as a function of an orifice check valve 44. Fluid communication between a purge passage 42 and the desiccant volume 32, via the exit passage 36, is also controlled as a function of the orifice check valve 44. The purge passage 42 also fluidly communicates with the purge air storage volume 22. The respective operations of the delivery check valve 26 and the orifice check valve 44 are described in more detail below. A threaded neck 46 (connector) is used for securing the cartridge 16 (including the desiccant volume 32) to the dryer housing 18.

The delivery check valve 26 controls the fluid communication between the desiccant volume 32 and the delivery air storage volume 24 as a function of a pressure in the purge passage 42. More specifically, the delivery check valve 26 closes the fluid communication between the purge passage 42 and the delivery air storage volume 24 when a pressure in the purge passage 42 is below a delivery level (delivery enable pressure). Also, the delivery check valve 26 opens fluid communication between the purge passage 42 and the delivery air storage volume 24 when the pressure in the purge passage 42 is at least the delivery level.

The orifice check valve 44 is positioned such that it controls the flow of pressurized air between the exit passage 36 and the purge passage 42. Alternatively, if the exit passage 36 and the purge passage 42 are deemed to be a single passage, the orifice check valve 44 is positioned in that single passage. A biasing means 50 (e.g., a spring) urges the orifice check valve 44 to a restricted flow (first) position, which is illustrated in FIG. 2. A seal 52 (e.g., an o-ring) creates a seal between the exit passage 36 and the purge passage 42 when the orifice check valve 44 is in the restricted flow position. In this position, the orifice check valve 44 provides restricted or limited fluid communication between the desiccant volume 32 and the purge air storage volume 22 via an orifice channel 54, which provides constant fluid communication between the desiccant volume 32, the purge passage 42, and the purge air storage volume 22. The orifice check valve 44 remains in the restricted flow position when a pressure in the desiccant volume 32 and, consequently, the exit passage 36 is below a purge fill level (purge enable pressure). Also, the orifice check valve 44 is set to an increased flow (second) position, when the pressure in the exit passage 36 is at least the purge fill level. While in the increased flow position, the sealing means 52 is unseated for creating additional flow communication between the exit passage 36 and the purge passage 42. Pressurized air is provided to the purge air storage volume 22 and the delivery storage volume 24 as a function of the respective positions of the orifice check valve 44 and the delivery check valve 26.

As the purge fill level pressure is less than the delivery pressure, when the exit passage 36 is between the purge fill level pressure and the delivery level pressure, the delivery check valve 26 is set to the closed position for preventing fluid communication between the exit passage 36 (and the desiccant volume 32) and the delivery air storage volume 24 while, at the same time, the orifice check valve 44 is set to the increased flow position. Once the pressure in the exit passage 36 reaches the delivery level, the delivery check valve 26 opens, and the orifice check valve 44 remains in the increased flow position. The significance of the delivery check valve and orifice check valve positions will be discussed in more detail below with respect to the operation of the air dryer system.

During operation, the air dryer system switches between a drying cycle (charge cycle) and a regeneration (purge) cycle. In the drying cycle, the pressurized air from the compressor 12 enters the air dryer cartridge 16 via ports 56. The dryer cartridge 16 includes eight (8) ports 56; however, other numbers of ports, e.g., six (6) ports, are also possible. The number, location, and size of the ports are variable and are selected to provide a desired air flow while maintaining sufficient structural integrity of the cartridge. The compressed air is then communicated through the desiccant 34 in the desiccant volume 32 and into the exit passage 36. As discussed above, until the pressure in the exit passage 36 builds to the purge fill level pressure, the orifice check valve 44 remains in the restricted flow position and the delivery check valve 26 remains in the closed position. Therefore, the fluid communication of the dried and cleaned air in the exit passage 36 is restricted to flowing to the purge air storage volume 22 via only the orifice channel 54. Furthermore, the fluid communication between the exit passage 36 and the delivery air storage volume 24 is closed.

Once the pressure in the exit passage 36 raises to at least the purge fill level, but is less than the delivery level (e.g., about 115 psi), the orifice check valve 44 is set to the increased flow position while the delivery check valve 26 remains in the closed position. Therefore, the pressurized air exiting the desiccant volume 32 passes from the exit passage 36 to the purge passage 42 and the purge air storage volume 22 via the orifice check valve 44 (including the orifice channel 54). After the pressure in the purge passage 42 and the purge air storage volume 22 builds to at least the delivery pressure, the delivery check valve 26 is out for providing fluid communication between the purge passage 42 and the delivery air storage volume 24. Therefore, once the pressure in the purge passage 42 is above the delivery pressure, the orifice check valve 44 is set to the increased flow position and the delivery check valve 26 is set to the open position.

When the delivery check valve 26 is initially set to the open position (after the orifice check valve 44 was previously opened), the pressure in the purge air storage volume 22 is at about the delivery pressure. At this point, the exit passage 36 is in fluid communication with both the purge air storage volume 22 and the delivery air storage volume 24. Therefore, the pressurized air is communicated from the exit passage 36 to both the purge air storage volume 22 and the delivery air storage volume 24. Consequently, the pressure in the purge air storage volume 22 continues to increase as pressure builds in the delivery air storage volume 24. More specifically, the pressure in the purge air storage volume 22 continues to increase until reaching a final purge pressure level (e.g., 135 psi) and the pressure in the delivery air storage volume 24 continues to increase until reaching a final delivery pressure level (e.g., 130 psi). Other acceptable pressure levels are also contemplated depending on desired brake system operation. Because the orifice check valve 44 is set to the increased flow position before the delivery check valve 26 is set to the open position, the "first air" exiting the desiccant volume 32 is stored in the purge air storage volume 22. The "first air" refers to the first air dried by the desiccant 34 after the desiccant 34 has been regenerated (purged) as described below. It is to be understood that the first air dried by the desiccant 34 after the desiccant 34 is regenerated is typically the driest air that will exit the desiccant 34 until the desiccant is regenerated again.

Furthermore, for one example illustrating contemplated operating pressures, the delivery air storage volume 24 is at about 110 psi when the pressure in the purge passage 42 and the purge air storage volume 22 reaches a delivery air storage volume pressure (e.g., 110 psi) and the delivery check valve 26 is initially opened. The bias spring of the delivery check valve 26 between the delivery air storage volume 24 and the purge air storage volume 22 causes a pressure differential between the final purge pressure level and the final delivery pressure level, with the final purge pressure level being higher than the final delivery pressure level. For example, in one embodiment, the spring force of the bias spring results in a final purge pressure level that is about 5 psi higher than the final delivery pressure level.

Once the delivery air storage volume 24 reaches a predetermined cutoff pressure, a governor (not shown) unloads the compressor 12 so that no more pressurized air is supplied to the air dryer 14. While the compressor 12 is unloaded, the air dryer 14 may be switched into the purge cycle. During the purge cycle, a purge valve (not shown) is opened for exhausting the pressurized air in the desiccant volume 32 (and the exit passage 36) to atmosphere. Once the pressure in the desiccant volume 32 and the exit passage 36 drops below the delivery level, the delivery check valve 26 is set to the closed position for preventing fluid communication between the desiccant volume 32 and the delivery air storage volume 24. Then, after the pressure in the desiccant volume 32 drops below the purge fill level, the orifice check valve 44 also is set to the restricted flow position. Consequently, the only fluid communication between the purge air storage volume 22 and the desiccant volume 32 is via the orifice channel 54. In this mode, the previously cleaned and first dried pressurized air in the purge air storage volume 22 is communicated to the desiccant volume 32 (and atmosphere) via the orifice channel 54. The restricted airflow through the orifice channel 54 increases the time for exhausting the air in the purge air storage volume 22, which provides increased effectiveness of the purging cycle.

The air dryer system and cartridge described above is the system and cartridge disclosed in U.S. Pat. No. 7,520,922, and utilizes the orifice check valve 44 in the cartridge 16 to provide enhanced functionality over prior art air dryer systems. It will be appreciated, however, that other prior art systems are in use that utilize cartridges that do not include the check valve 44 and/or other features of cartridge 16. As noted above, prior art systems are not generally compatible with cartridges having a check valve, and the system 10 described above is not generally compatible with prior art cartridges that do not have the check valve. Accordingly, two different cartridges would typically be manufactured—one for each type of system—when the only significant difference between the two types of cartridges is the inclusion of the orifice and check valve. This results in increased costs due to manufacturing, warehousing, shipping, etc. two separate parts.

Figure 3:
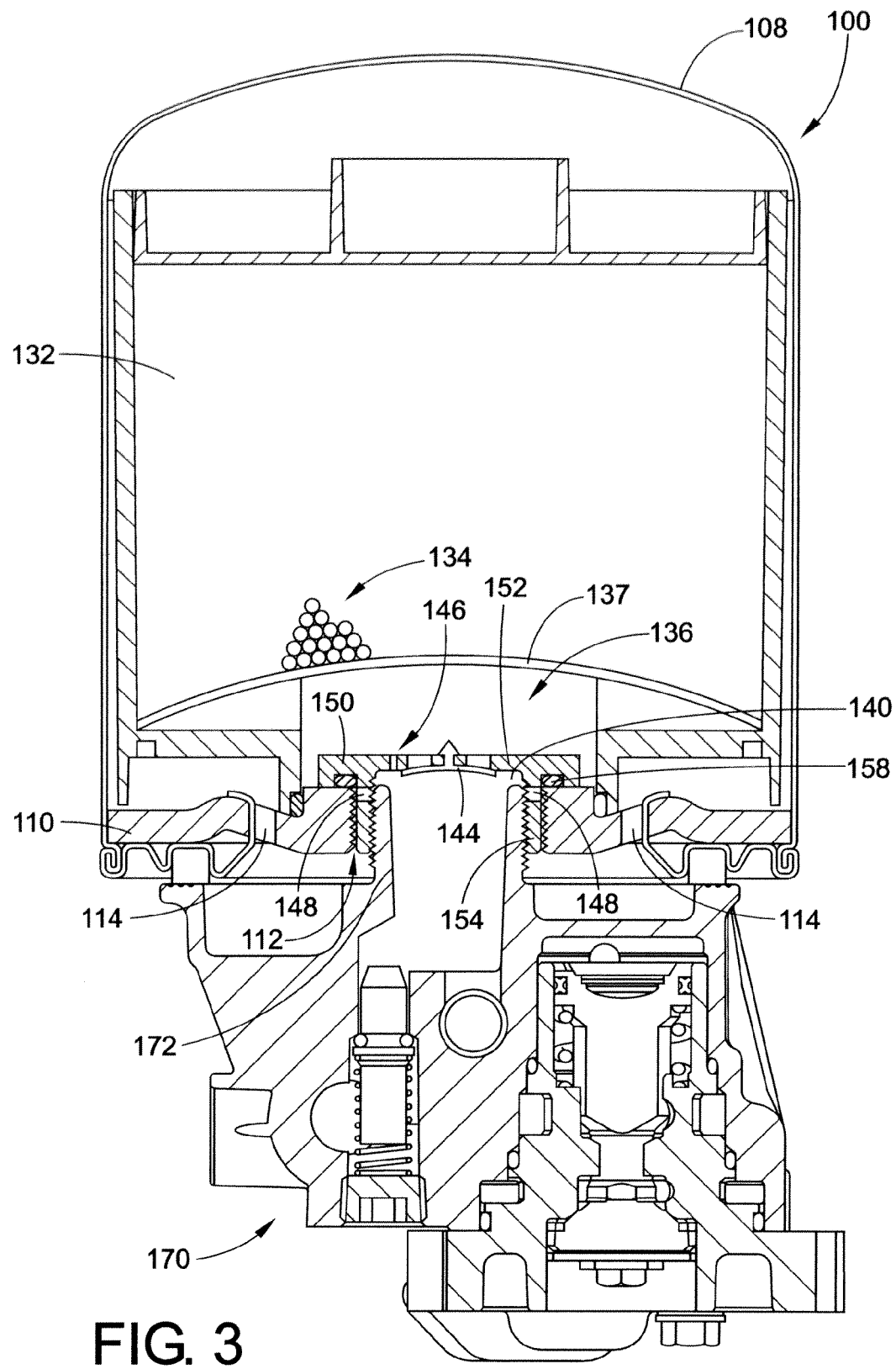
FIG. 3 is a cross-sectional view of an exemplary air dryer cartridge in accordance with the disclosure installed on a first type of air dryer housing.
Figure 4:
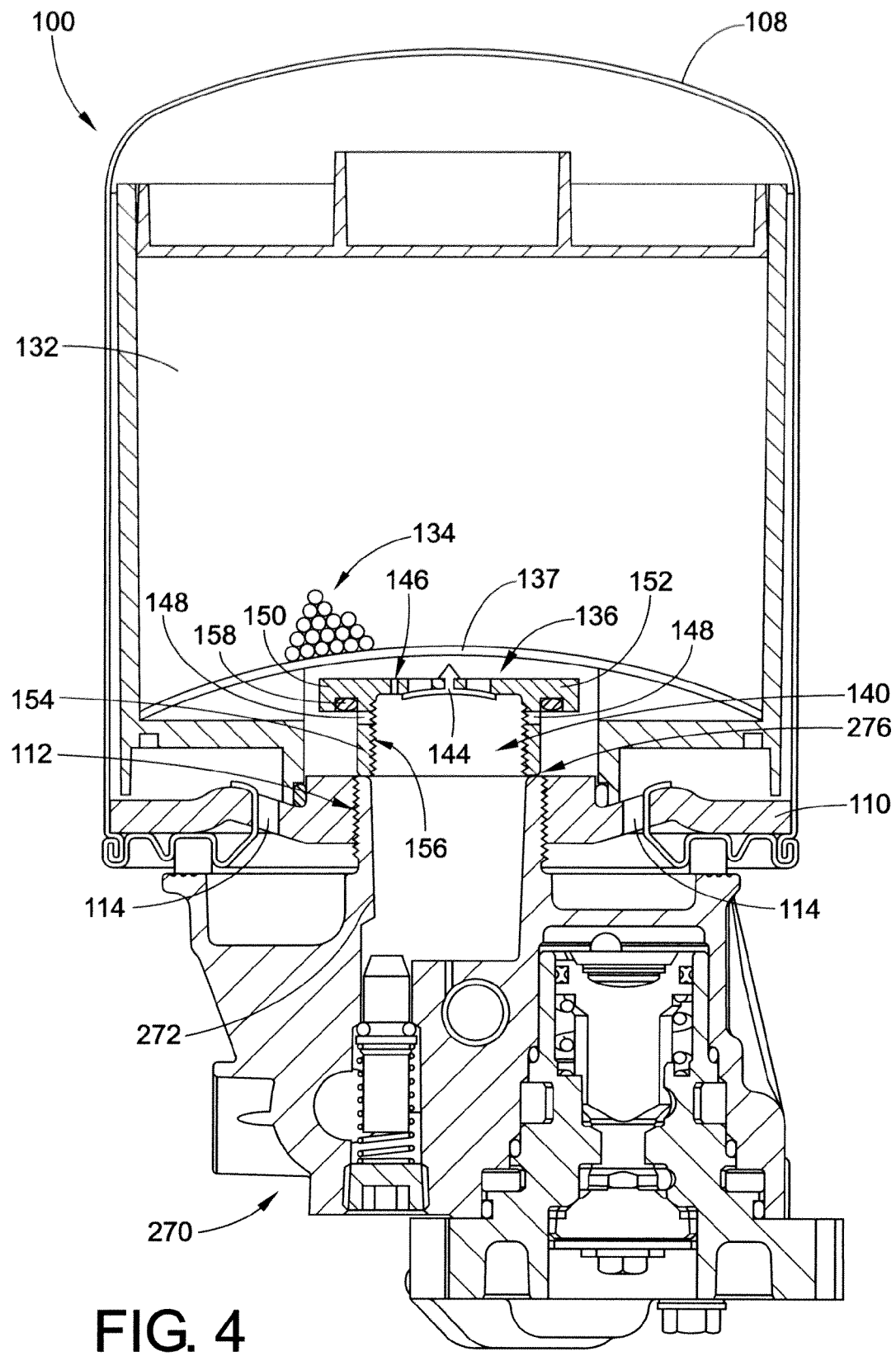
FIG. 4 is a cross-sectional view of the air dryer of FIG. 3 installed on a second type of air dryer housing.

Turning to FIGS. 3-6, and initially to FIGS. 3 and 4, an exemplary cartridge 100 is illustrated in accordance with the present disclosure that is compatible with both types of air dryer systems. The cartridge 100 shares many of the same features as cartridge 16 described above, with the exception of the connectors for connecting the cartridge 100 to the different air dryers and for activating/deactivating an internal orifice and check valve. Thus, the cartridge 100 includes a cartridge housing 108 secured to a cartridge base 110 that includes a first connector in the form of a bore having female threads 112 for connecting the cartridge to a standard air dryer housing (typically 39 mm threads). A desiccant volume 132 includes a desiccant material 134 for removing at least one of moisture and contaminants from the air received from a compressor through intake passages or ports 114. An exit passage 136 fluidly communicates with the desiccant volume 132 via perforate element 137. A delivery port 140 fluidly communicates with the desiccant volume 132 via the exit passage 136 as a function of a check valve 144 and orifice 146 (flow control devices), or via bypass passages 148, depending on the type of air dryer system in which the cartridge is installed.

Check valve 144, orifice 146 and bypass passages 148 are located on a movable member 150 that is configured to move between the position shown in FIG. 3 and the position shown in FIG. 4 to selectively activate/deactivate the bypass passages 148. Movable member 150 includes an upper portion 152 of a first diameter supporting the check valve 144 and a tubular lower portion 154 of a smaller diameter extending from a bottom surface of the upper portion 152 and having a second connector in the form of female threads 156 (see FIG. 4) for mating with corresponding male threads on the housing of an air dryer. As will be appreciated, the movable member is telescopically received within the threaded bore including threads 112, and is movable between the position shown in FIG. 3 where threads 156 are axially coextensive with threads 112, to the position of FIG. 4 where the threads 156 are axially spaced from the threads 112. The upper portion 152 of movable member 150 also has a groove in which a sealing element (o-ring) 158 is situated for sealing the movable member 150 against the base 110 of the cartridge (as shown in FIG. 3). The orifice 146 extends axially through the upper portion 152, and the bypass passages 148 extend radially through the sidewall of the tubular lower portion 154 of the movable member 150.

In FIG. 3, the cartridge 100 is installed on an air dryer system 170 that operates in a similar manner to the system 10 described above, and thus requires a cartridge having the internal check valve and orifice for proper operation. To provide this functionality, the bypass passages 148 must be deactivated to ensure the fluid flows between the desiccant volume 132 and the delivery port 140 via the check valve 144 and/or the orifice 146. Thus, the system 170 is equipped with a threaded nipple 172 of a diameter for mating with the female threads 156 of the movable member 150. As the cartridge 100 is screwed onto nipple 172, the moveable member 150 is drawn downwardly relative to the cartridge housing 108 until annular seal 158 seals the moveable member 150 against the base 110. Seal 158 effectively prevents fluid flow through bypass passages 148 and, thus, all flow between the desiccant volume 132 and the delivery port 140 is via the check valve 144 and/or orifice 146.

In FIG. 4, cartridge 100 is shown installed on a conventional air dryer housing 270. As mentioned above, the conventional air dryer housing 270 requires a cartridge without internal check valving for proper operation. In this installation, the cartridge 100 is connected to the dryer housing 270 via threaded nipple 272 which is adapted to mate with female threads 112 in the base 110 of the cartridge 100. The threaded nipple 272 is larger in diameter than the threaded nipple of 172 of FIG. 3 (conventional dryer housings typically have 39 mm threads, versus the 31 mm threads on the movable member 150). Accordingly, as the cartridge 100 is screwed onto the housing 270, an axial end face 276 of the threaded nipple 272 abuts an axial end face of the lower tubular portion of the movable member 150 and urges the movable member 150 upwardly to the final position shown in FIG. 4.

With the movable member 150 displaced upward from its position in FIG. 3, the bypass passages 148 are activated, as they are no longer sealed off by seal 158, thus allowing fluid to bypass the check valve 144 and orifice 146. With the bypass passages 148 open, the check valve 144 and orifice 146 are essentially removed from the flow circuit, and the cartridge 100 acts like a conventional cartridge without an internal check valve and/or orifice.

Figure 5:
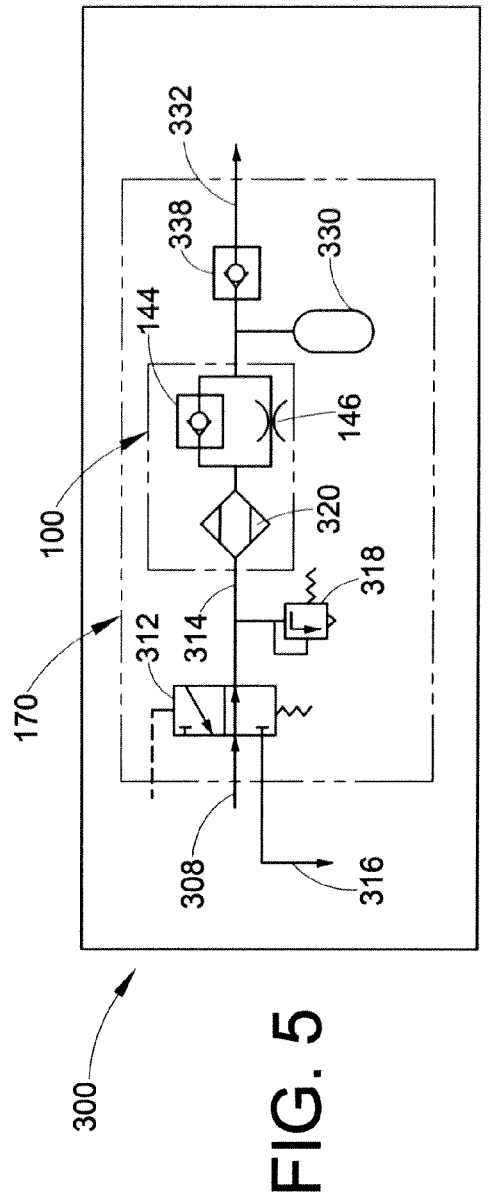
FIG. 5 is a schematic diagram of an air dryer system including the air dryer housing and cartridge of FIG. 3.
Figure 6:
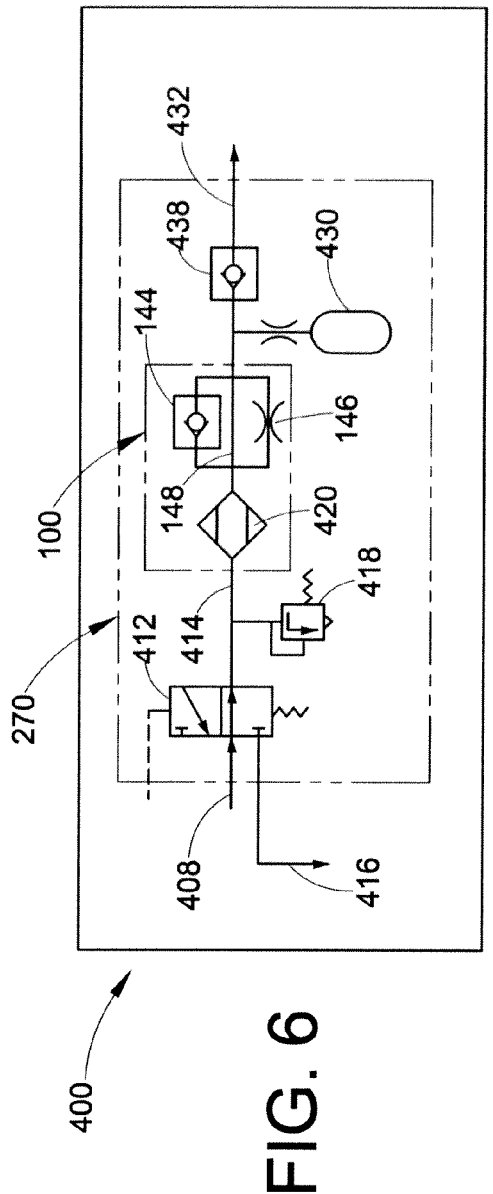
FIG. 6 is a schematic diagram of an air dryer system including the air dryer housing and cartridge of FIG. 4.

FIGS. 5 and 6 schematically illustrate air dryer 100 installed on respective dryer housings 170 and 270. By comparing the flow path of FIG. 5 to FIG. 6, the manner in which cartridge 100 can be utilized in each system type of air dryer system can be understood.

In FIG. 5, an exemplary air dryer system 300 includes dryer housing 170 and cartridge 100 in accordance with the present disclosure. As will be appreciated, cartridge 100 is connected to the system 300 via female threads 156 as described in connection with FIG. 3, thus deactivating/closing bypass passages 148 as also described above. Compressed air is supplied to the system 300 via a supply line 308 connected to a compressor or other source of compressed air. Supply line 308 is connected to a two-way valve 312 operable to supply the compressed air to the cartridge 100 via line 314 during a charge cycle, or to vent purge air from the system via purge line 316 during a purge cycle. A pressure relief valve 318 is connected to line 314 for venting excessive pressure from the system 300. Air received by the cartridge 100 passes through desiccant material 134 and then flows via check valve 144 and/or orifice 146 to purge tank 330 or to delivery line 332 for use or storage in an accumulator. A check valve 338 is provided in the delivery line 332 for ensuring that air first flows to the purge tank 330 and then to the delivery line 332 once pressure in the purge tank 330 reaches a prescribed level.

With reference to FIG. 6, the cartridge 100 is schematically illustrated installed in a conventional air dryer system 400 including dryer housing 270. As will be appreciated, the cartridge 100 is connected to the system via female threads 112 thus activating the bypass passages 148 as described above in connection with FIG. 4. Like the system 300 of FIG. 5, compressed air is supplied to the system 400 via a supply line 408 connected to a compressor or other source of compressed air. Supply line 408 is connected to a two-way valve 412 operable to supply the compressed air to the cartridge 100 via line 414 during a charge cycle, or to vent purge air from the system via purge line 416 during a purge cycle. A pressure relief valve 418 is connected to line 414 for venting excessive pressure from the system 400. Air received by the cartridge 100 passes through desiccant material 134 and then flows via bypass passage 148 to purge tank 430 or to delivery line 432 for use or storage in an accumulator. A check valve 438 is provided in the delivery line for ensuring that air first flows to the purge tank 430 and then to the delivery line once pressure in the purge tank 430 reaches a prescribed level. Although check valve 144 and orifice 146 physically still remain in the flow circuit, they are effectively removed from the flow circuit since air will simply flow between the desiccant volume 132 and the delivery port 140 via the bypass passage 148.

As will now be appreciated, the present disclosure sets forth an air dryer cartridge that can be installed in two different types of air dryer systems. Although described in the context of an air dryer system, aspects of the disclosure are applicable to other types of cartridges, such as filter cartridges and the like. Further, although the cartridge is secured via a threaded connection, other types of connections are possible, such as compression fit connections, bayonet-style connections, etc. In addition, quick-connect style fittings could also be used. In some embodiments, the movable member can be biased towards its first position whereat the bypass passages are closed. For example, a spring can be interposed between the movable member and the desiccant volume for urging the movable member to its first position. Also, in vertical installations, gravity can apply a biasing force to the movable member. Biasing the movable member is such fashion can make alignment and engaging of the female threads of the movable member with a corresponding threaded nipple easier.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A cartridge for an air dryer comprising: a cartridge housing; a desiccant volume within the cartridge housing containing a desiccant for removing at least one of moisture and contaminants from a stream of air; an intake port in fluid communication with the desiccant volume; a delivery port in fluid communication with the intake port via the desiccant volume; a flow control device which controls flow between the desiccant volume and the delivery port; and a selectively openable bypass passage which bypasses flow around the flow control device; wherein the bypass passage is not blocked when the cartridge is installed on a first type of air dryer thereby bypassing flow around the flow control device, and wherein the bypass passage is blocked when the cartridge is installed on a second type of air dryer thereby directing substantially all flow between the desiccant volume and the delivery port through the flow control device.

2. The cartridge as set forth in claim 1, wherein the cartridge further includes a first connector adapted to receive a nipple of first diameter associated with a first type of air dryer for securing the cartridge thereto, and a second connector arranged concentrically with the first connector and adapted to receive a nipple of a second diameter smaller than the first diameter associated with a second type of air dryer for securing the cartridge thereto.

3. The cartridge as set forth in claim 2, wherein the second connector is part of a movable member supported between the desiccant volume and the delivery port that is moveable telescopically between a first position whereat the second connector is axially coextensive with the first connector and a second position whereat the second connector is axially adjacent the first connector.

4. The cartridge as set forth in claim 3, wherein the movable member includes the flow control device and the bypass passage, the movable member configured to restrict flow through the bypass passage when the movable member is in the first position.

5. The cartridge as set forth in claim 4, wherein the bypass passage is in a tubular sidewall of the movable part.

6. The cartridge as set forth in claim 3, wherein the first and second connectors include threaded bores for threadedly engaging respective threaded nipples.

7. The cartridge as set forth in claim 6, wherein the second connector is closely received within the first connector such that when the first connector is threadedly engaged with an associated corresponding threaded nipple, the second connector is displaced by said nipple from the first position to the second position.

8. The cartridge as set forth in claim 3, wherein the second connector is biased towards the first position.

9. The cartridge as set forth in claim 1, wherein the flow control device includes at least one of a check valve or an orifice.

10. The cartridge as set forth in claim 1, wherein the cartridge is a spin-on type cartridge.

11. An air dryer system having an air dryer housing including:
   a 39 mm threaded nipple for receiving an air dryer cartridge, and
   the cartridge as set forth in claim 1 connected to the threaded nipple.

12. An air dryer system having an air dryer housing including:
   a 31 mm threaded nipple for receiving an air dryer cartridge, and
   the cartridge as set forth in claim 1 connected to the threaded nipple.

13. A base assembly for an air dryer cartridge comprising a base including a first connector configured to receive a nipple of first diameter for fluidly connecting the cartridge with a first type of air dryer, and a second connector arranged concentrically with the first connector and configured to receive a nipple of a second diameter smaller than the first diameter for fluidly connecting the cartridge to a second type of air dryer, wherein the second connector is movable with respect to the first connector between a first position axially coextensive with the first connector, and a second position axially adjacent the first connector; wherein the second connector is part of a movable member including a flow control device adapted to control the flow of air through the base, and a bypass passage for bypassing air around the flow control device, and wherein the second connector blocks the flow of air through the bypass passage when in the first position, and permits flow of air through the bypass passage when in the second position.

14. The base assembly for an air dryer cartridge as set forth in claim 13, wherein the first connector is a threaded bore, and the second connector includes a tubular portion telescopically received within the threaded bore when the second connector is in the first position.

15. The base assembly for an air dryer cartridge as set forth in claim 13, wherein the second connector includes a sealing surface adapted to seal the second connector to the base to restrict flow through the bypass passage when the second connector is in the first position.

16. The base assembly for an air dryer cartridge as set forth in claim 13, wherein the flow control device includes at least one of a check valve or an orifice.

17. An air dryer cartridge including purge air valving, the cartridge having a first connector for mating with a corresponding connector of a first type of air dryer system, and a second connector for mating with a corresponding connector of second type of air dryer system, whereby when the cartridge is installed on the first type of air dryer system, the purge air valving within the cartridge is deactivated causing the cartridge to act as a conventional air dryer cartridge, and when the cartridge is installed in the second type of air dryer system, the purge air valving within the cartridge is activated thus enabling the system to function as designed.

18. The air dryer cartridge as set forth in claim 17, further including a selectively openable bypass passage for bypassing flow around the purge valving.

19. An air dryer cartridge for an associated air dryer, the cartridge having a first air flow path and a second air flow path, and means for selectively attaching the air dryer cartridge to the associated air dryer so to pass air flow during a purge cycle through the first or second air flow path, wherein the first air flow path includes a restriction, wherein the second air flow path bypasses the restriction in the first air flow path, and wherein when the cartridge is installed on a first type of air dryer air passes through the second airflow path thereby bypassing the restriction in the first airflow path, and when the cartridge is installed on a second type of air dryer the second airflow path is blocked thereby directing substantially all flow through the restriction in the first airflow path.

20. An air dryer cartridge comprising a desiccant volume including a desiccant material, and a base including a first connector configured to receive a nipple of first diameter for fluidly connecting the cartridge with a first type of air dryer, and a second connector arranged concentrically with the first connector and configured to receive a nipple of a second diameter smaller than the first diameter for fluidly connecting the cartridge to a second type of air dryer, wherein the second connector is movable with respect to the first connector between a first position axially coextensive with the first connector, and a second position axially adjacent the first connector, and wherein the air dryer cartridge has a first air flow path through the desiccant material during a purge cycle when the first connector is engaged with an associated first type of air dryer, and a second air flow path through the desiccant material, different than the first flow path, when the second connector is engaged with an associated second type of air dryer.

* * * * *